United States Patent [19]

Tsutsumi

[11] Patent Number: 5,765,781
[45] Date of Patent: Jun. 16, 1998

[54] FISHING SPINNING REEL HAVING AN OFF-AXIS SUPPORTING SECTION

[75] Inventor: Wataru Tsutsumi, Tokyo, Japan

[73] Assignee: Daiwa Seiko, Inc., Tokyo, Japan

[21] Appl. No.: 641,425

[22] Filed: May 1, 1996

[30] Foreign Application Priority Data

May 2, 1995 [JP] Japan ................................. 7-166763

[51] Int. Cl.⁶ .............................................. A01K 89/01
[52] U.S. Cl. ................................................ 242/232
[58] Field of Search .............................. 242/230, 231, 242/232, 233

[56] References Cited

U.S. PATENT DOCUMENTS 5,379,957  1/1995  Furomoto et al. .................. 242/230

FOREIGN PATENT DOCUMENTS

| 925931 | 9/1947 | France | 242/232 |
| 1109107 | 1/1956 | France | 242/231 |
| 520638 | 4/1957 | Italy | 242/232 |
| 6-197670 | 7/1994 | Japan | |

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

A fishing spinning reel having a rotor with supporting arms coupled to bail supporting members. The bail supporting members have a bail mounted therebetween and a fishing-line guide section coupled to one of the bail supporting members. The rotor is rotated in association with the rotation of a handle. The bail supporting members swing between a fishing-line take-up position and a fishing-line let-out position, selectively. The reel has a supporting section which supports the bail supporting member of at least one of the supporting arms of the rotor that has a fishing line guide section. This supporting section is oriented to be on the side of the rotor, relative to a plane including the center axis of the rotor, in which the bail is positioned when in the fishing-line take-up position.

11 Claims, 3 Drawing Sheets

FISHING SPINNING REEL HAVING AN OFF-AXIS SUPPORTING SECTION

BACKGROUND OF THE INVENTION

1. Field of the Invention

The present invention relates to fishing spinning reels, and more particularly to a technique of miniaturizing a fishing spinning reel having a fishing-line guide device.

2. Description of the Related Art

A fishing spinning reel is generally designed with a rotor, which is turned in association with the rotation of a handle, and which is provided with supporting arms. The supporting arms of the rotor have respective supporting members for securing the ends of a half-ring-shaped bail and for mounting a fishing line guide roller. The supporting members can be freely swung selectively between a fishing-line take-up position and a fishing-line let-out position with respect to the supporting arms of the rotor.

The supporting members provided with the bail and the line guide roller, as disclosed, for instance, by Japanese Patent Application (OPI) No. 197670/1994 (the term "OPI" as used herein means an "unexamined publication application"), are supported by the ends of the rotor's supporting arms, and capable of swinging. The supporting arms of the rotor are offset from the axis of rotation of the rotor in a direction opposite to the bail when in the fishing-line take-up position. In other words, with respect to a reference plane containing the axis of rotation of the rotor, the rotor's supporting arms are located on the same side as the bail in the fishing line let-out position.

In the case of the fishing spinning reel, in order to let the fishing line feed out from the spool, the bail is raised. However, as described above, the rotor's supporting arms, to which the supporting members are coupled, are located within the fishing line let-out side. Hence, when the bail is raised (i.e., when it is in the state in which the line is released or let out), and the supporting members are swung in a direction from the fishing line take-up side to the fishing line let-out side, the radial distance between the central axis of the rotor and either of the supporting members is increased. In order to prevent the finger holding the reel leg from interfering with the supporting members when the fishing line is released, the reel is so designed that its leg is relatively long. However, if the leg is long, then the reel body is likely to swing left and right during the reel operation. This adversely affects not only the fishing-line take-up operability but also the operability when the fishing-line is being let out.

In addition, the elongated reel leg gives rise to the following problems. First, the long leg renders transportation of the reel cumbersome. Next, the long leg creates problems during use. For example, when the fishing line is to be let out with the bail raised, the long leg makes it rather difficult to lock or retain the fishing line with the index finger; that is, the long leg impairs the operability of the reel. Furthermore, as was described above, the reel with the long leg is liable to swing right or left while the fishing line is let out from the reel. Accordingly, the operability is adversely affected both when the fishing line is taken up and when the fishing-line is let out.

SUMMARY OF THE INVENTION

In view of the foregoing, an object of the present invention is to provide a fishing spinning reel which is miniaturized by shortening the leg of the reel body. A further object is to provide a reel that can be thumbed with ease. Yet another object is to provide a reel that can be more easily shipped and transported.

The foregoing and other objects of the invention are achieved by a fishing spinning reel in which bail supporting members having a bail and a fishing-line guide section attached thereto are coupled to supporting arms of a rotor. The rotor is rotated in association with the rotation of a handle in such a manner that the bail supporting members swing between a fishing-line take-up position and a fishing-line let-out position. According to the invention, a supporting section, which supports the bail supporting member of at least one of the supporting arms of the rotor that includes the fishing line guide section, is displaced and disposed on the fishing-line take-up side with respect to the central axis of the rotor.

As described above, a supporting section, which supports the bail supporting member of the supporting arm of the rotor that includes the fishing line guide section, is displaced and disposed on the fishing-line take-up side. Hence, the distance of the supporting member, which is obtained when the bail is raised, is shortened.

DETAILED DESCRIPTION OF THE INVENTION

Preferred embodiments of the invention will be described in detail, with reference to the accompanying drawings.

Figure 1:
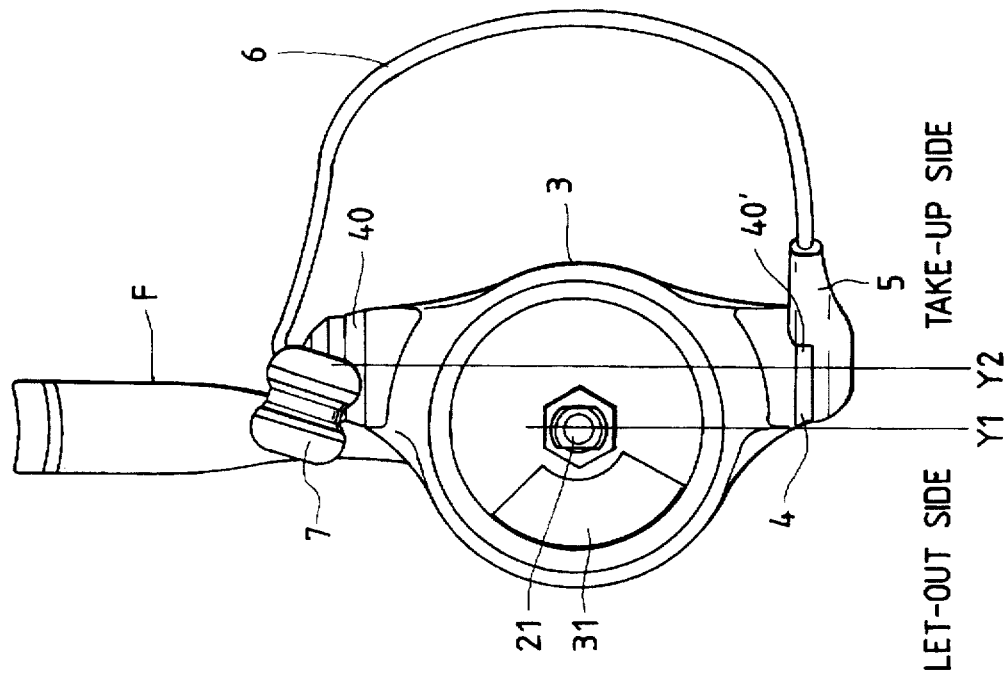
FIG. 1 is a side view showing an example of a fishing spinning reel, which constitutes a first embodiment of the invention.
Figure 2:
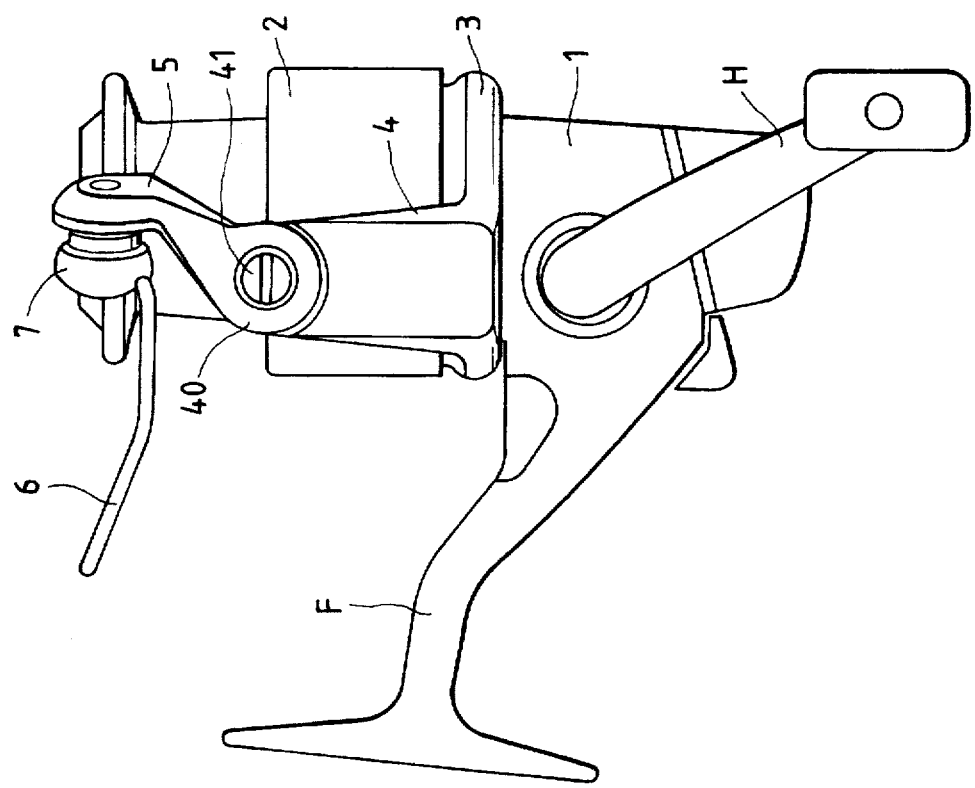
FIG. 2 is a front view of the fishing spinning reel according to the first embodiment of the invention, which is in a fishing-line take-up state.
Figure 4:
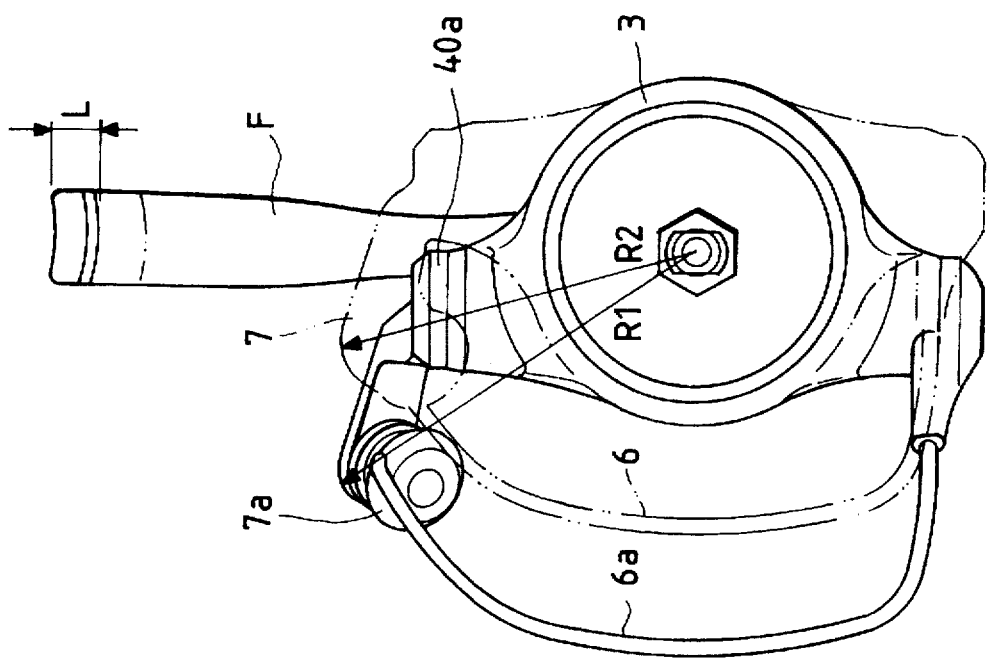
FIG. 4 is a front view of the fishing spinning reel according to the first embodiment, in the fishing-line let-out state, provided for the purpose of comparing the fishing spinning reel of the present invention with a conventional fishing spinning reel.
Figure 3:
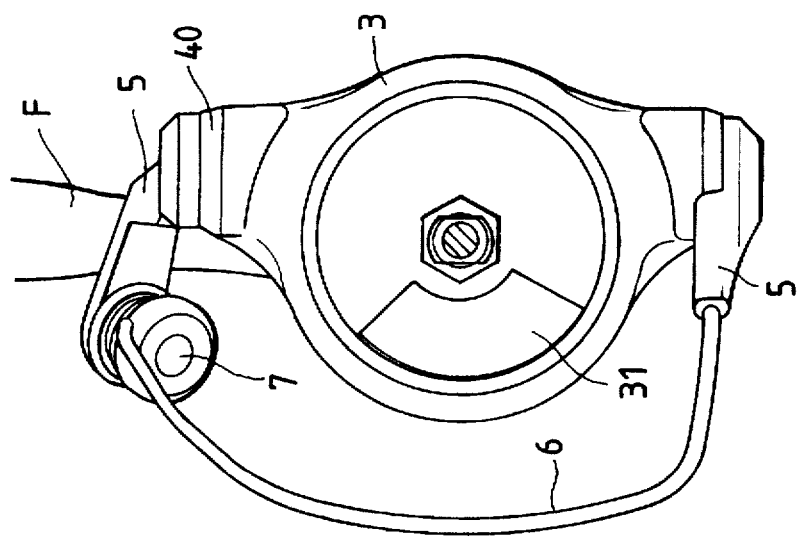
FIG. 3 is a front view of the fishing spinning reel according to the first embodiment of the invention, which is in a state of releasing or letting out the fishing-line.

FIG. 1 illustrates a side view of an example of a fishing spinning reel, in accordance with a first embodiment of the invention. FIG. 2 illustrates a front view showing the fishing spinning reel in a fishing-line take-up state, and FIG. 3 shows a front view showing the fishing spinning reel in a fishing-line let-out state. FIG. 4 illustrates a front view for comparing the fishing spinning reel of the invention with a conventional fishing spinning reel.

As shown in FIGS. 1, 2 and 3, in the fishing spinning reel according to the invention, as in conventional reels, the reel body has a leg (or foot) F. In front of the reel body 1 the following components are provided: a spool 2 which is movable back and forth; a rotor 3 which is spaced from the spool 2 and rotates around the spool 2; and a pair of bail supporting arms 4 which extend in a forward direction from respective positions on the rotor 3 (only one bail supporting arm 4 being shown in FIG. 1). The components provided further include bail supporting members 5 secured to ends of the aforementioned supporting arms 4 (only one bail supporting member 5 being shown in FIG. 1).

The bail supporting member 5 is supported by the one supporting arm 4 and capable of pivoting thereabout. The other bail supporting member is similarly supported by the other bail supporting arm and capable of pivoting. A bail 6 is connected between the bail supporting members 5. A fishing-line guide roller 7 (hereinafter referred to as "a line roller 7") is provided on one side of the bail supporting members 5. Finally, a handle H is provided and adapted to rotate the rotor 3 and to move the spool 2 back and forth. The mechanisms for moving the spool back and forth and for turning the rotor 3 are not limited to those described herein. Similar types of mechanisms, such as those found in conventional fishing spinning reels, may also be utilized.

In FIGS. 1 through 3, reference numeral 40 designates a supporting section. The supporting section 40 pivotally engages a shaft 41, which supports the bail supporting members 5 in such a manner that the supporting members may be swung from a fishing-line let-out position to a fishing-line take-up position and back. One feature of the present invention resides in the positioning of the supporting section 40.

In the fishing spinning reel according to the present invention, the center of rotation of the rotor 3 coincides with the spool shaft 21. A perpendicular line Y1, as shown in FIG. 2, passes through the center axis of the rotor 3, extending in the same direction as the leg F. As is apparent from FIG. 2, the supporting section 40 of the bail supporting member 5 is offset from the center axis (the perpendicular line Y1) of the rotor.

That is, as shown best in FIGS. 1 and 2, the supporting shaft 41, which rotatably supports the supporting section 40, is offset from the center axis (line Y1) of the rotor, such that a perpendicular line Y2 extending from the support shafts 41 and parallel to the line Y1 is located on the fishing line take-up side of the bail, with respect to the first-mentioned perpendicular line Y1. The fishing line take-up side corresponds to the side of the rotor, with respect to the perpendicular line Y1, in which the bail is situated when the fishing line is being taken in. The fishing line take-up side is identified as the "Take-up Side" in FIG. 2 (i.e., to the right of the perpendicular line Y1). Similarly, the fishing line let-out side corresponds to the side of the rotor, with respect to the perpendicular line Y1, in which the bail is situated when the fishing line is being let out. The fishing line let out side is identified as the "Let-out Side" in FIG. 2 (i.e., to the left of the perpendicular line Y1).

Hence, when the bail 6 is swung from the fishing-line take-up position, as shown in FIG. 2, to the fishing-line let-out position, as shown in FIG. 3, the fishing-line guide device 7 and the bail 6 protrude comparatively little radially. This is because the swinging fulcrum is located on the fishing-line take-up side with respect to the rotor's central axis (line Y1).

This fact will be explained more specifically with reference to FIG. 4, by comparing the structure of a spinning reel according to the present invention with a typical conventional fishing spinning reel. In the conventional fishing spinning reel (illustrated by solid lines), the supporting section 40a is located on the fishing-line let-out side with respect to the central axis of the rotor 3. Therefore, the fishing-line guide device 7a and the bail 6a are located (also indicated by the solid lines) considerably farther from the center axis when the bail 6a is in the fishing line let-out position.

On the other hand, with the fishing-line spinning reel according to the present invention, the fishing-line guide device 7 and the bail 6 are located as indicated by the two-dot chain lines. As seen in FIG. 4, the inventive reel has a line guide device and bail which, when placed in the let-out position, protrude radially outward from the center axis to a lesser extent than they do in the conventional reel. In other words, let a radius of gyration R define the outermost circumferential path traversed by the fish-line guide device 7a. When compared with the radius of gyration R1 for the conventional fishing-line spinning reel, the radius of gyration R2 of the corresponding part of the fishing-line spinning reel of the invention is smaller. The above-described reduction in the radius of gyration R2 makes it possible to reduce the length of the leg F by as much as a length L which is proportional to the decrease in the radius of gyration (R1−R2).

As described above, according to the present invention, the supporting section 40 is positioned to the fishing line take-up side. As a result, it is desirable to adjust the rotary balance of the rotor. This adjustment may be achieved, for instance, by attaching a balancer 31 made of lead or the like to the rotor 3 as shown in FIG. 3, or another type of discrete weight. However, the invention is not limited thereto or thereby. That is, the rotary balance of the rotor may be achieved by other means, such as adjusting the wall thickness of the rotor 3, for instance by grinding.

In the above-described first embodiment, the bail support arm 4 is entirely offset from the central axis of the rotor 3 (or the line Y1) so that the supporting section 40 (or the line Y2) is located on the fishing-line take-up side with respect to the central axis of the rotor.

Figure 5:
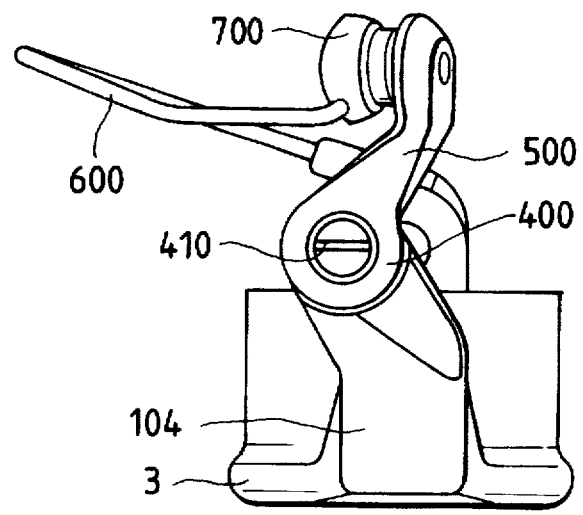
FIGS. 5 and 6 are a side view and a front view, respectively, showing essential components of another example of a fishing spinning reel, which constitutes a second embodiment of the invention.
Figure 6:
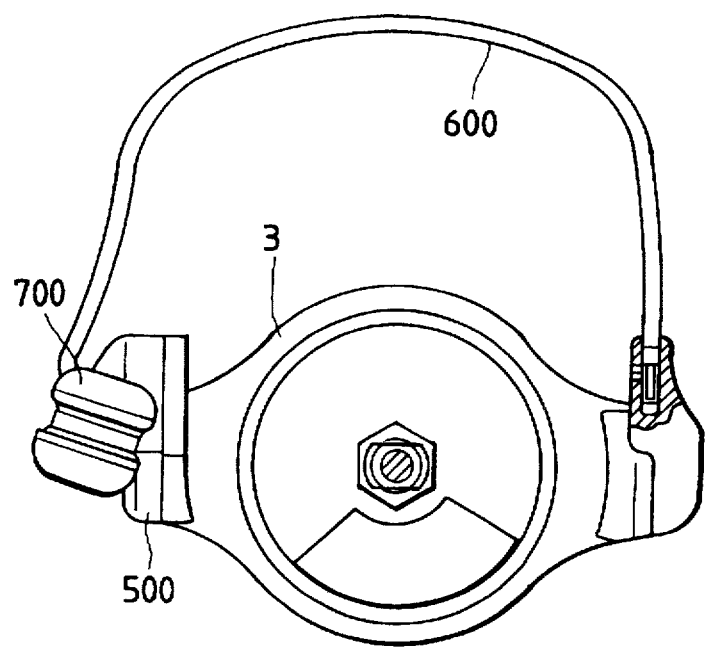

However, the invention is not limited thereto or thereby. For instance, it may be modified as shown in FIGS. 5 and 6, which illustrate a spinning reel according to a second embodiment of the present invention. According to the second embodiment, the bail support arm 104 protrudes from a portion of the rotor 3 located on the perpendicular line Y1, such that the bail support arm 104 is at least partially located within the fishing-line let-out side with respect to the central axis of the rotor 3. As shown, the bail support arm 104 is bent and inclined to extend into the fishing line take-up side. As a result, the supporting shaft 410 of the supporting section 400 is located within the fishing line take-up side with respect to the central axis of the rotor 3. In this case, the fishing-line guide section 700 is located closer to the center axis of the rotor 3, such that the length of the bail supporting member, measured from the central axis of the rotor when the bail 600 is raised, is decreased.

In addition, although in the above-described first embodiment of the present invention both of the supporting sections 40, 40' are located on the fishing-line take-up side with respect to the central axis of the rotor 3, as shown in FIG. 2, the invention is not restricted thereto or thereby. For example, as shown in FIGS. 5 and 6, the positioning of only one supporting section 400 within the fishing-line take-up side provides for a reduction in the maximum radial length or deviation of the rotating components from the central axis of the rotor 3 when the bail 600 is in the fishing-line let-out position. Such a construction further provides a reduction in length of the reel leg.

As in the first embodiment, the second embodiment also provides for a balancer to adjust the rotary balance of the rotor. The balancer may be a discrete weight or achieved by other means, such as by adjusting the thickness of the walls.

As described above, the spinning reel of the present invention is designed such that the supporting section, adapted to support the bail supporting member on the side where the fishing-line guide section is provided, is displaced from the central axis of the rotor perpendicularly and is located within the fishing-line take-up side on which the bail lies in its fishing-line take-up setting, with respect to the central axis of the rotor. Hence, the radial length of the bail supporting member, measured from the central axis of the rotor, which is obtained when the bail is raised, is decreased. The leg of the reel body can be reduced in length by a corresponding amount. As a result, the spinning reel is free of unwanted swinging actions during operation of the reel. In addition, for the same reason, the reel can be miniaturized and its portability is improved. In the case where the leg is short, as described above, the distance between the spool and the index finger of the angler holding the reel becomes short, and thumbing the fishing line or the spool which is rotating can be achieved with ease.

What is claimed is:

1. A fishing spinning reel comprising:
    a rotor having first and second bail supporting arms and rotatable about a rotation axis;
    first and second bail support members coupled to said first and second bail supporting arms and pivotable about first and second pivot axes with respect to said first and second supporting arms, respectively, said first bail support member having a fishing-line guide section; and
    a bail coupled to said first and second bail support members, and selectively movable between a first position, for taking up a fishing-line, and a second position, for letting out the fishing-line,
    wherein an imaginary plane containing said rotation axis of said rotor defines a fishing-line take-up side to which said bail in said first position is located and a fishing-line let-out side to which said bail in said second position is located,
    wherein said first pivot axis is located within said fishing-line take-up side, and
    wherein said second pivot axis is located within said fishing-line take-up side.

2. A fishing spinning reel according to claim 1, wherein said first bail support arm is entirely located within said fishing-line take-up side.

3. A fishing spinning reel according to claim 1, wherein said first bail support arm is partially located within said fishing-line take-up side.

4. A fishing spinning reel according to claim 3, wherein at least a portion of said first bail support arm extends obliquely with respect to said rotation axis.

5. A fishing spinning reel according to claim 1, wherein said second bail support arm is entirely located within said fishing-line take-up side.

6. A fishing spinning reel according to claim 1, further comprising: a counter-weight located on said rotor and within said fishing-line let-out side for achieving a dynamic balance of said rotor when said bail is in said first position.

7. A fishing spinning reel according to claim 1, further comprising: balancing means, disposed on said rotor and within said fishing-line let-out side, for achieving a dynamic balance of said rotor when said bail is in said first position.

8. A fishing spinning reel according to claim 7, wherein said balancing means comprises a discrete weight.

9. A fishing spinning reel according to claim 7, wherein said balancing means comprises a weight integrally formed with said rotor.

10. A fishing spinning reel according to claim 9, wherein said weight integrally formed with said rotor is formed by varying a thickness of the rotor body.

11. A fishing spinning reel according to claim 1, further comprising:
    a reel body, including a leg, for rotatably supporting said rotor,
    wherein said imaginary plane extends orthogonally to a plane of symmetry bisecting said rotor into substantially symmetrical halves and also extends in parallel to a longitudinal axis of said leg.

* * * * *